2 Sheets--Sheet 1.

J. N. McLEAN & J. BENNOR.
Brick-Machines.

No. 142,114. Patented August 26, 1873.

Witnesses.
Harry King.
Phil. T. Dodge.

Inventors.
John N. McLean
Joseph Bennor.
by Dodge & Munn
Attys.

J. N. McLEAN & J. BENNOR.
Brick-Machines.
No. 142,114. Patented August 26, 1873.
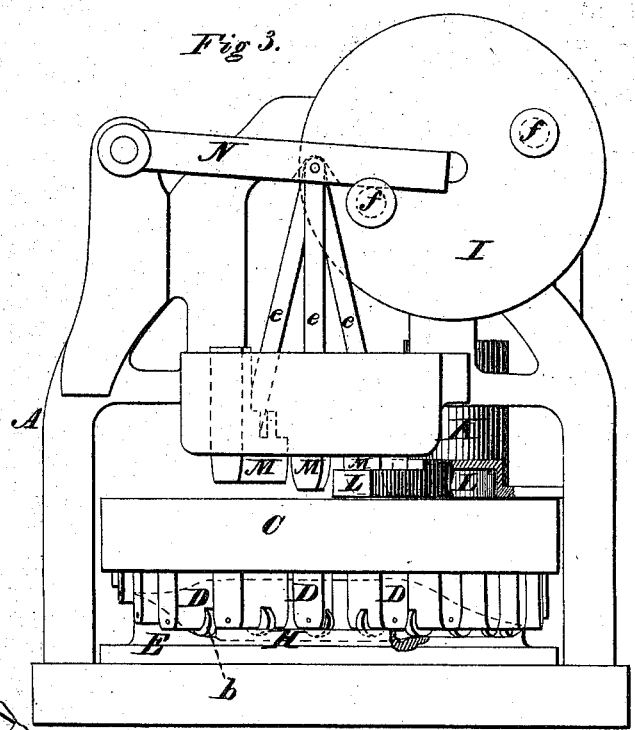
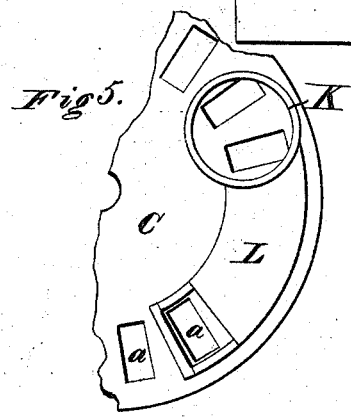
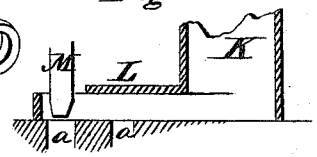
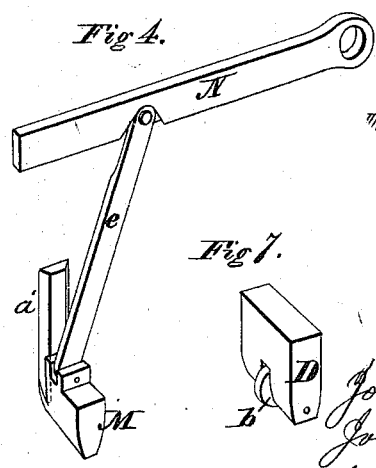

UNITED STATES PATENT OFFICE.

JOHN N. McLEAN AND JOSEPH BENNOR, OF PHILADELPHIA, PA.

IMPROVEMENT IN BRICK-MACHINES.

Specification forming part of Letters Patent No. 142,114, dated August 26, 1873; application filed July 12, 1873.

*To all whom it may concern:*

Be it known that we, JOHN N. McLEAN and JOSEPH BENNOR, of Philadelphia, in the county of Philadelphia and State of Pennsylvania, have invented certain Improvements in Brick-Machines, of which the following is a specification, reference being had to the accompanying drawings.

Our invention relates to a machine in which the molds are formed in a horizontal revolving table, and the clay fed into them from a pug-mill, and then compressed by beaters or hammers; and the invention consists in the novel construction and arrangement of various details of the mechanism for forming the brick and for delivering them when finished, and, also, in a novel grinding apparatus for preparing the clay.

Figure 1:
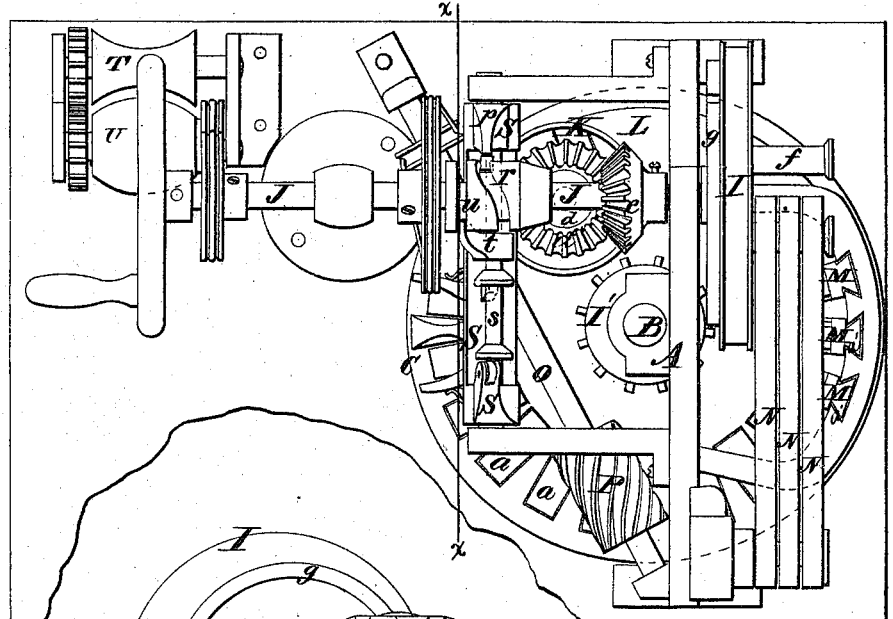
Figure 2:
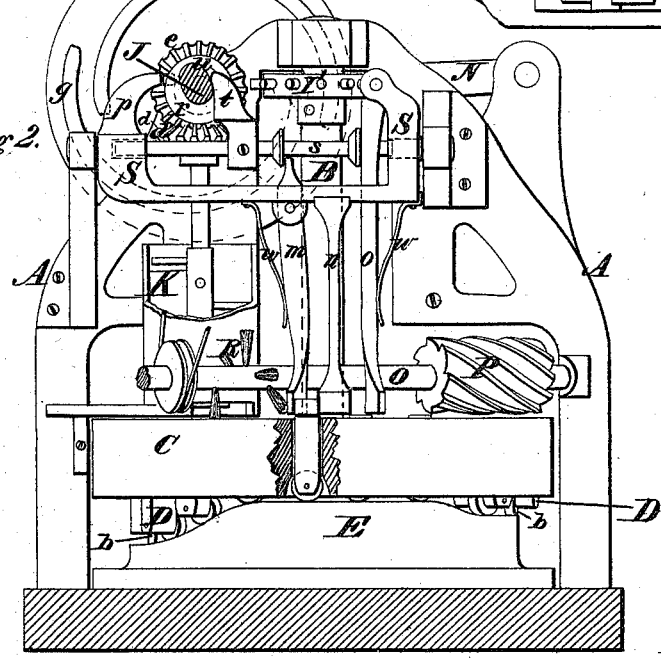
Figure 3:
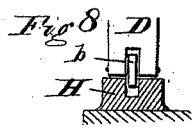

Figure 1 is a top plan view of the machine; Fig. 2, a vertical section of the same on the line *x x* of Fig. 1; Fig. 3, a side elevation of the machine; Fig. 4, a perspective view of one of the hammers or beaters; Fig. 5, a plan view of the mold-table and pug-mill; and Fig. 6, a vertical section of the same. Fig. 7 is a perspective view of the sliding mold-bottom detached, and Fig. 8 is a side view representing the same resting on the track.

A represents a strong frame, in which there is mounted a vertical shaft, B, carrying on its lower end the horizontal circular table C, which is provided with the series of molds or cells $a$, which extend down through it. In the molds there are mounted sliding bottoms D, provided on their under sides with rollers $b$, which run on a stationary track or rail, E, as shown in Figs. 2 and 3, the track having its top so shaped that, as the bottoms are carried around over it by the revolution of the table, it lowers them so as to permit the clay to be filled into the molds, and then raises them so as to deliver the bricks in the usual manner. In order to relieve the rollers from strain, and to support the bottoms firmly when the hammers fall upon the clay in the molds, the track E is widened and raised for a portion of its length, and provided with a groove in its middle, as shown at H in Figs. 3 and 8, so that, as the bottoms come around to said portion, they bear directly thereon, while the rollers travel in the groove without bearing. By this arrangement the weight is, for the time being, taken off of the rollers, and the bottoms allowed to bear firmly on the solid track, so that they cannot yield or give when the hammers fall. On the upper end of the vertical table-shaft there is mounted a spur-wheel, I', and across the frame there is mounted a shaft, J, carrying on one end a wheel, I, which is provided with two flanges or teeth, $g$, which engage in the spur-wheel and turn it so as to revolve the table. The flanges $g$ are concentric with the wheel for a portion of their length, and eccentric for the remainder, so that while the eccentric portion is acting on the spur-wheel it turns the table forward, and that when the concentric portion comes into play it holds the table still. By this arrangement it will be seen the table is given an intermittent movement, while the shaft J, from which it is driven, revolves continuously. As there are two of the ribs or teeth which are shaped alike and act alternately, the table is advanced and stopped twice during each revolution of the wheel I. The object of thus giving the table an intermittent movement is to hold the molds still while being filled and when the hammers fall, and to allow the delivering devices to seize the molded brick, as hereinafter described. In one side of the frame there is mounted an ordinary pug-mill, K, the shaft of which is provided with a bevel-pinion, $d$, which is driven by a pinion, $e$, on the main shaft J, so that the mill continues in operation when the mold-table stops. The lower open end of the pug-mill bears on the face of the mold-table, so that, as the empty molds pass under it, it fills them with clay. In order to insure the filling of the molds an open-bottomed case or box, L, is extended from the bottom of the pug-mill around some distance on top of the mold-table. The pug-mill keeps this case full of clay under pressure, so that it will be sure to fill the molds in case they were not filled while under the pug-mill. This filling of the molds is rendered more certain by the table stopping while they are under the case, and while the pug-mill continues to force the clay therein.

In order to compact the clay into the molds three vertically-sliding hammers or weights, M, are mounted in the side of the frame and connected, by rods e, to three levers, N, which are raised and then released by pins f on the outside of the wheel I. As the wheel revolves each pin, in turn, acts upon the levers and raises the hammers and then allows them to fall. The first hammer strikes down through the end of the case or box L, as shown in Fig. 6, so as to drive the clay down into the molds. The hammers are each provided with a dovetail arm, a', on one end, as in Fig. 4, which works in a corresponding groove in the frame, as shown in Fig. 1, so as to hold and guide the hammer.

The various parts are so adjusted that the hammers are all raised during each movement of the table, and then allowed to fall the instant the table stops. The table is moved each time a distance equal to that from one mold to the next, and is stopped in such a position that the hammers will fall directly into or over the molds.

It will be seen that under this arrangement each mold is stopped under and receives the blow of each of the three hammers in turn, the clay in each mold receiving three blows, one from each hammer. In order that the hammers may thus enter the molds, when the table is advanced only from one mold to the next, it is necessary that the molds shall all be arranged equidistant from each other and from the center of the table, that they shall all stand in the same relative position to the center, and that the hammers shall be arranged to correspond, so that each hammer can enter any mold in the table.

We are aware that machines have been heretofore constructed in which three hammers or beaters were arranged in connection with a mold-table; but in such machines the molds were arranged in groops of three, parallel with each other, and the hammers arranged to correspond, so that it was necessary to bring one of the groups under the hammers and then hold the table still while the hammers delivered three blows, each mold receiving all its blows from the same hammer. After the blows had been thus delivered the hammers were raised and held until the table was moved forward a distance of three molds, so as to bring the next group under the hammers. This long movement of the table was necessary because as the molds did not all stand in the same relative position to each other the hammers could not otherwise have entered.

By arranging the molds and hammers on our plan, so that the hammers can be dropped at each movement, we effect a great saving of time and produce the bricks more rapidly than can be done with any machine of this class heretofore constructed.

Another advantage of our arrangement is that it permits of any desired number of molds being used, while in the ordinary machines there must be a number of complete groups, the number of molds being necessarily divisible by the number of hammers.

For the purpose of finishing or smoothing the top of the clay after it has been compacted into the molds, so as to complete the brick, a shaft, O, is mounted horizontally above the table, and provided on one end with a cylinder, P, having spiral knives attached to its face, as shown in Figs. 1 and 2. The shaft O is provided with a pulley and driven by a belt from a pulley on the main shaft J, so that the blades of the cylinder travel in the same direction as, but faster than, the table. As the beaters drive the clay down below the face of the table the track E is arranged so as to raise the bottoms just before their molds reach the cylinder, so as to force the clay up in order that the spiral knives may act upon it. The knives dress the clay down flush with the face of the table, and thus make the brick of the proper thickness and smooth their upper faces. After the molds pass the cylinder P their bottoms are raised flush with the face of the table, so as to force the bricks up out of the molds. The shaft O is provided, on the end opposite to that carrying the cylinder, with a round brush, R, which serves to clean off the faces of the mold-bottoms as they pass under it.

For the purpose of delivering the brick, there is pivoted to the side of the frame a rocking head or frame, S, provided with three depending arms, $m$, $n$, and $o$, the middle arm being attached rigidly while the others are pivoted. The head S is provided with an upright arm, $p$, which works on a grooved cam, $r$, on the main shaft J, as shown in Figs. 1 and 2, so that, as the shaft revolves, the cam tips the frame back and forth, and thereby swings the lower ends of its arms inward and outward over the edge of the table. In the head S there is mounted a sliding rod, $s$, provided with collars which bear against the pivoted arms $m$ and $o$, and, with an arm or stud, $t$, which bears against a cam, $u$, on the main shaft, so that, as the cam turns around, it pushes the rod endwise and causes the pivoted arms to swing outward, away from the rigid middle arm $n$. Springs $w$ are arranged to bear against the pivoted arms for the purpose of swinging them inward toward each other as the cam $u$ turns around, so as to let the rod slide back. When the mold-table stops with the finished bricks lying on top, the arms separate, swing inward over the table, close together so as to seize and hold two bricks, swing outward so as to carry the bricks off from the table, and then separate so as to drop the bricks upon the apron or other conveyer that may be used to carry them off. As the arms take off two bricks at a time, it is only necessary to have them swing inward at every second movement of the table—there being but one brick formed at each movement.

For the purpose of grinding the clay and removing stones and other obstructions therefrom, a mill of the form shown in Fig. 1 is employed, the mill consisting simply of a concave roll, T, and a convex roll, U, placed side by side and geared together. The clay is pulverized and passed down between the rolls, while any stones or other obstructions which are too large to pass through are worked toward the end of the rolls and allowed to escape.

If desired, the arms $m$, $n$, and $o$ may be provided with pivoted face pieces or heads on their ends, which will be certain to fit flatly against the bricks when the arms close together. Instead of arranging the three hammers to strike into adjoining molds, they may be arranged in any other suitable positions, provided they can all enter molds at each stroke. The arrangement shown is, however, considered the best one, as it enables the hammers to be all operated from one wheel, and thus avoids complication.

Having thus described our invention, what we claim is—

1. A horizontal mold-table having its molds arranged equidistant from each other, and in the same relative positions to the center, in combination with a series of hammers arranged to correspond as set forth, so that each mold can receive the different hammers in turn.

2. In combination with the mold-table C and its spur-wheel I', and with the hammers M connected to the levers N, the wheel I provided with the teeth or ribs $g$ and the pins $f$, whereby the table is given an intermittent movement, and the hammers operated at the proper intervals, as set forth.

3. In combination with the sliding mold-bottoms, supported on rollers, the grooved support H, arranged to sustain the bottoms and relieve the rollers from the blows of the hammers, as set forth.

4. In combination with the mold-wheel, the open-bottomed case L, extending outward from the bottom of the pug-mill, substantially as described, to insure the fitting of the molds, as set forth.

5. The case L, in combination with the mold-table and the hammer M, arranged to strike through the end of the case, to force the clay into the molds, as set forth.

6. The mold-wheel, in combination with the cylindrical head P, provided with spiral blades for dressing and finishing the upper face of the bricks, as set forth.

7. The rocking-frame S, provided with the depending arms $m$, $n$, and $o$, and with the sliding rod $s$, in combination with the cams $r$ and $u$, when arranged to operate as described, for the purpose of removing the brick.

8. The shaft, provided with the head P at one end and the brush R at its opposite end, in combination with the horizontally-rotating mold-wheel, as herein set forth.

JOHN N. McLEAN.
JOSEPH BENNOR.

Witnesses to signature of JOHN N. McLEAN:
J. McKENNEY,
H. B. MUNN.

Witnesses to signature of JOSEPH BENNOR:
ROBERT R. SMITH,
GEORGE C. McINTIRE.